US008506219B2

(12) United States Patent
Ness

(10) Patent No.: US 8,506,219 B2
(45) Date of Patent: Aug. 13, 2013

(54) OFFSHORE CARGO RACK FOR USE IN TRANSFERRING FLUID HOLDING TANK LOADS BETWEEN A MARINE VESSEL AND AN OFFSHORE PLATFORM

(76) Inventor: Danny Ness, Metairie, LA (US)

( * ) Notice: Subject to any disclaimer, the term of this patent is extended or adjusted under 35 U.S.C. 154(b) by 0 days.

(21) Appl. No.: 13/563,344

(22) Filed: Jul. 31, 2012

(65) Prior Publication Data

US 2013/0105020 A1 May 2, 2013

Related U.S. Application Data

(63) Continuation of application No. 12/409,154, filed on Mar. 23, 2009, now Pat. No. 8,231,316.

(60) Provisional application No. 61/146,949, filed on Jan. 23, 2009.

(51) Int. Cl.
*B60P 7/06* (2006.01)

(52) U.S. Cl.
USPC .......... 410/46

(58) Field of Classification Search
USPC .......... 410/46; 108/51.11, 55.1, 55.3
See application file for complete search history.

(56) References Cited

U.S. PATENT DOCUMENTS

| | | | |
|---|---|---|---|
| 1,705,649 | A | 3/1929 | Scott |
| 2,506,412 | A | 5/1950 | Chausse |
| 2,566,873 | A | 9/1951 | Britton |
| 2,683,010 | A | 7/1954 | Hamerslag, Jr. |
| 3,916,803 | A | 11/1975 | Garcia |
| 4,165,806 | A | 8/1979 | Cayton |
| 4,828,311 | A | 5/1989 | Hayashi |
| 5,156,233 | A | 10/1992 | Olsen et al. |
| 5,292,012 | A | 3/1994 | Davis et al. |
| 5,385,233 | A | 1/1995 | Mckibben et al. |
| 5,507,237 | A | 4/1996 | Barrow et al. |
| 6,112,760 | A | 9/2000 | Scott et al. |
| 6,357,365 | B1 | 3/2002 | Higgins et al. |
| 6,371,299 | B1 | 4/2002 | Essary |
| 6,915,815 | B1 | 7/2005 | Ness |
| 6,983,704 | B1 | 1/2006 | Ness |
| 7,552,687 | B1 | 6/2009 | Ness |
| 7,997,214 | B1 | 8/2011 | Ness |
| 8,231,316 | B2 | 7/2012 | Ness |
| 2005/0098559 | A1 | 5/2005 | Morales et al. |

*Primary Examiner* — H Gutman

(74) *Attorney, Agent, or Firm* — Garvey, Smith, Nehrbass & North, L.L.C.; Charles C. Garvey, Jr.; Vanessa M. D'Souza

(57) ABSTRACT

A cargo rack for transferring loads between a marine vessel and an offshore marine platform provides a frame having a front, a rear, and upper and lower end portions. The lower end portion has a perimeter beam base, a raised floor and a pair of open-ended parallel fork tine tubes that communicate with the perimeter beam at the front and rear of the frame. Openings in the perimeter beam base align with the forklift tine tubes. The frame includes fixed side walls extending upwardly from the perimeter beam. A plurality of gates are movably mounted on the frame, each gate being movable between open and closed positions, the gates enabling a forklift to place fluid holding tanks on the floor by accessing either the front of the frame or the rear of the frame. A manifold arrangement with fittings enables transfer of fluid in any tank to a common outlet.

33 Claims, 7 Drawing Sheets

OFFSHORE CARGO RACK FOR USE IN TRANSFERRING FLUID HOLDING TANK LOADS BETWEEN A MARINE VESSEL AND AN OFFSHORE PLATFORM

CROSS-REFERENCE TO RELATED APPLICATIONS

This is a continuation of U.S. patent application Ser. No. 12/409,154, filed 23 Mar. 2009 (issuing as U.S. Pat. No. 8,231,316 on 31 Jul. 2012), which is a non-provisional patent application of U.S. Provisional Patent Application Ser. No. 61/146,949, filed 23 Jan. 2009, each of which is hereby incorporated herein by reference.

Priority of U.S. Provisional Patent Application Ser. No. 61/146,949, filed 23 Jan. 2009, incorporated herein by reference, is hereby claimed.

International Application No. PCT/US2010/028287, filed on 23 Mar. 2010 (published as International Publication No. W02010/111252 on 30 Sep. 2010), is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to cargo racks for transferring goods between marine vessels and offshore platforms such as oil and gas well drilling and production platforms. More particularly, the present invention relates to an improved cargo rack that enables a user to load the rack with multiple fluid holding tank loads and to then transport the entire rack using a lifting device such as a crane or a forklift from the marine vessel to the platform. Additionally, the entire rack can be moved on land or on the platform with a crane or forklift. A manifold arrangement directs flow from each tank to a common discharge.

2. General Background

In the exploration of oil and gas in a marine environment, fixed, semi-submersible, jack-up, and other offshore marine platforms are used during drilling operations. Fixed platforms are typically used for production of oil and gas from wells after they have been drilled. Drilling and production require that an enormous amount of supplies be transported from land based storage facilities. Supplies are typically transferred to offshore platforms using very large marine vessels called work boats. These work boats can be in excess of one hundred feet in length and have expansive deck areas for carrying cargo that is destined for an offshore platform. Supplies are typically transferred from a land based dock area to the marine vessel using a lifting device such as a crane or a mobile lifting and transport device such as a forklift.

Once a work boat arrives at a selected offshore platform, supplies or products are typically transferred from the deck of the work boat to the platform using a lifting device such as a crane.

Once on the deck of a drilling platform or production platform, space is at a premium. The storage of supplies on an offshore oil well drilling or production platform is a huge problem. Liquids that must be transferred to the offshore platform can include: any liquid useful in the exploration, drilling or production of oil and/or gas.

Many cargo transport and lifting devices have been patented. The table below lists some patents that relate generally to pallets, palletized racks, and other cargo racks.

TABLE 1

| Pat. No. | TITLE | ISSUE DATE |
|---|---|---|
| 2,683,010 | "Pallet and Spacer" | Jul. 6, 1954 |
| 3,916,803 | "Loading Platform" | Nov. 4, 1975 |
| 4,165,806 | "Palletizing System for Produce Cartons and the Like" | Aug. 28, 1979 |
| 4,828,311 | "Metal Form Pallet" | May 9, 1989 |
| 5,156,233 | "Safety Anchor for Use with Slotted Beams" | Oct. 20, 1992 |
| 5,292,012 | "Tank Handling and Protection Structure" | Mar. 8, 1994 |
| 5,507,237 | "Lifting Apparatus for Use with Bulk Bags" | Apr. 16, 1996 |
| 6,357,365 | "Intermediate Bulk Container Lifting Rack" | Mar. 19, 2002 |
| 6,371,299 | "Crate Assembly and Improved Method" | Apr. 16, 2002 |

BRIEF SUMMARY OF THE INVENTION

The present invention provides an improved cargo rack apparatus that includes a frame having a front, a rear, and upper and lower end portions.

The lower end portion of the frame provides a structural perimeter beam that can be preferably a plurality of beams that are welded end to end to form a generally square or rectangular base.

A raised floor is attached to the perimeter beam or beams. A pair of open-ended parallel forklift tine tubes or sockets are provided that communicate with the perimeter beam (or beams) at both the front and the rear of the frame.

Openings in the perimeter beam align with these forklift tine sockets or tubes.

The frame preferably includes a plurality of side walls that extend upwardly from the perimeter beam including at least left and right side walls and front and rear gated side walls. A plurality of gates are mounted to the frame including a gate at least in the front and at the rear of the frame. Preferably a pair of gates can be provided both at the front and at the rear of the frame.

Each gate is movable between open and closed positions. The gates enable a forklift to place loads on the raised floor by accessing either the front or the rear of the frame.

The frame provides positioning beams that segment the raised floor into a plurality of load holding positions. A manifold directs fluid from each tank to a common discharge.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
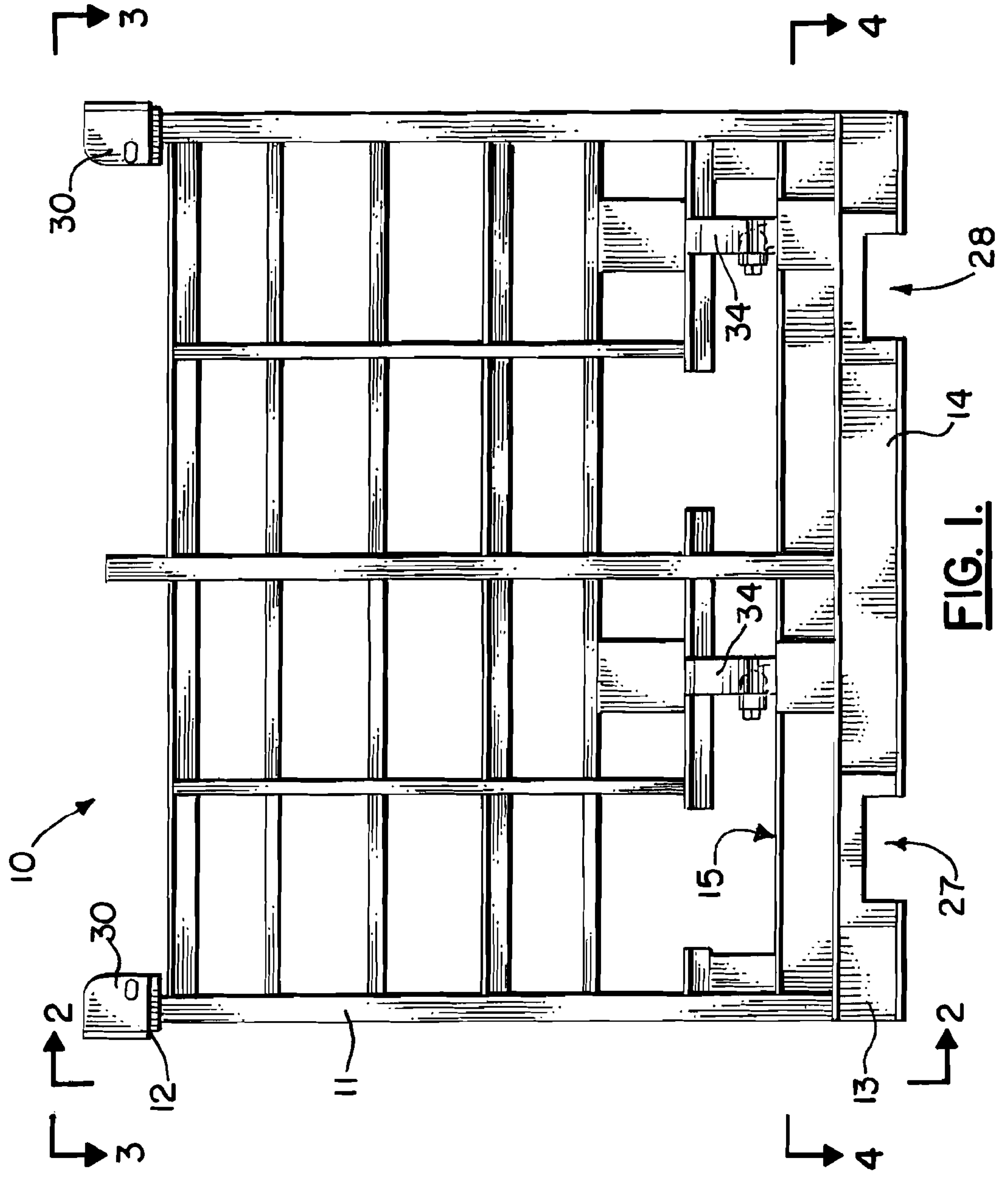
FIG. 1 is an elevation view of the preferred embodiment of the apparatus of the present invention.

Transport apparatus 10 provides a frame 11 having upper end portion 12 and lower end portion 13. Lower end portion 13 provides undercarriage 14 with a floor 15. Floor 15 is subdivided into a plurality (e.g. four) of sections, each section for carrying a fluid containing tank or module 16.

Figure 2:
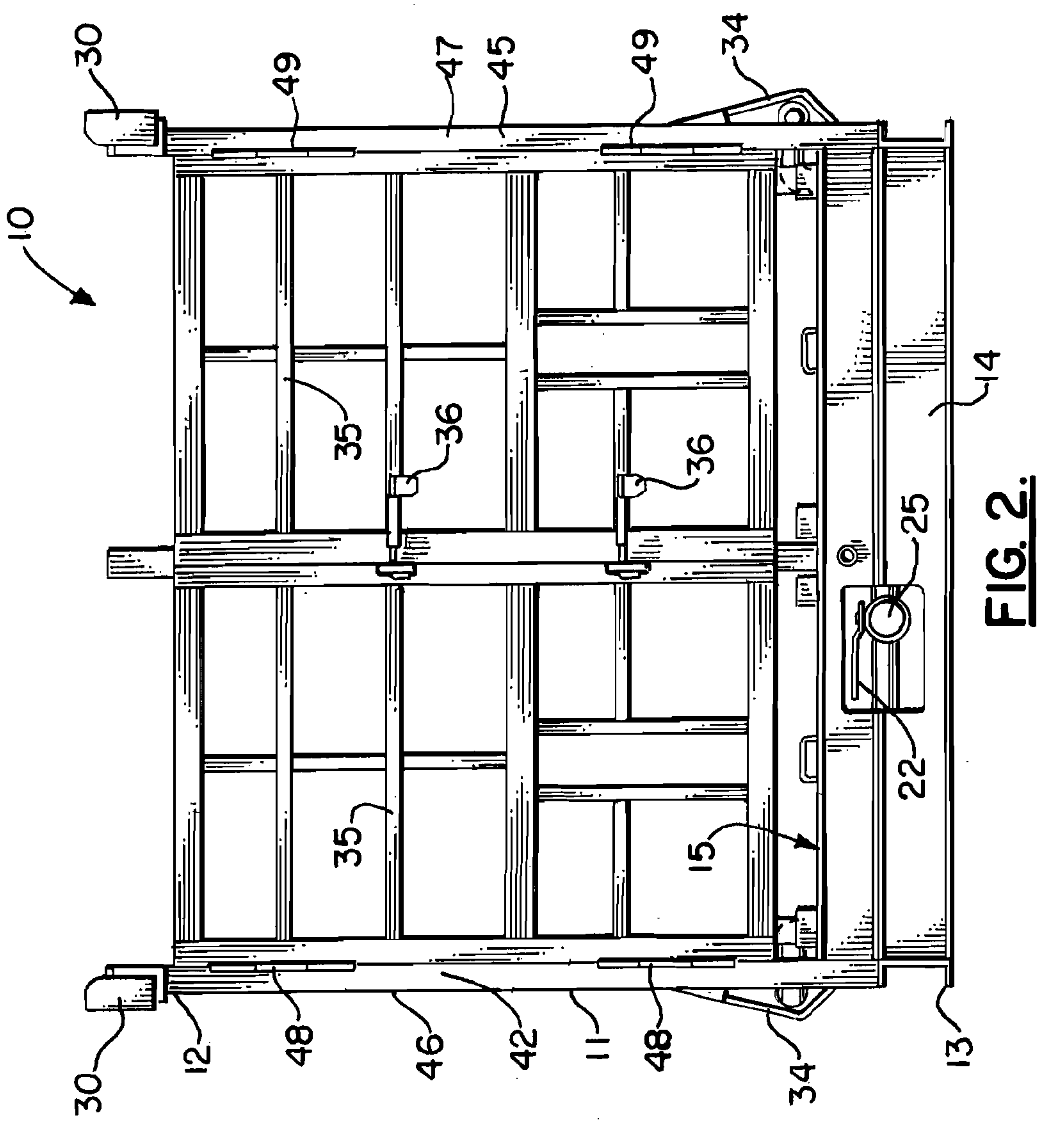
FIG. 2 is another elevation view of the preferred embodiment of the apparatus of the present invention taken along lines 2-2 of FIG. 1.
Figure 4:
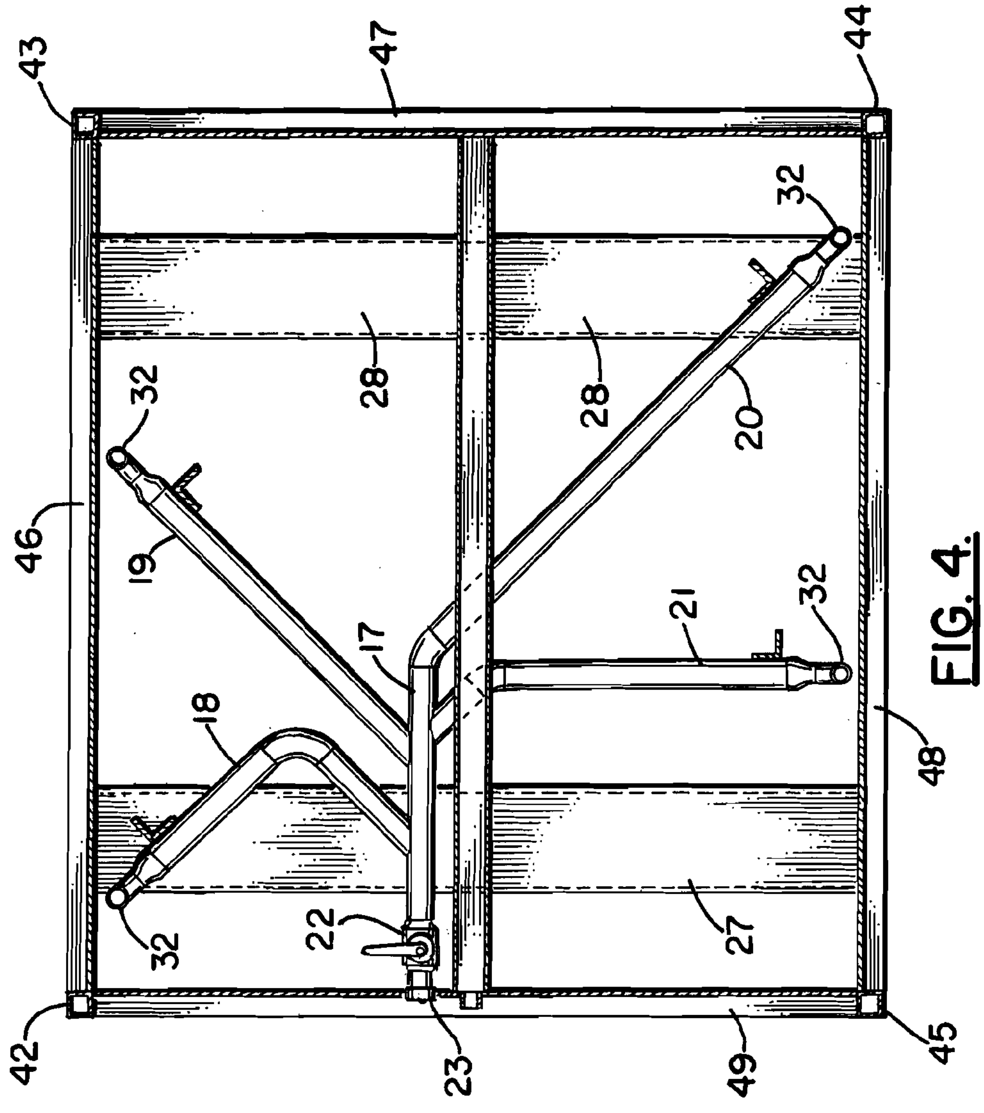
FIG. 4 is a sectional view of the preferred embodiment of the apparatus of the present invention taken along lines 4-4 of FIG. 1.
Figure 8:
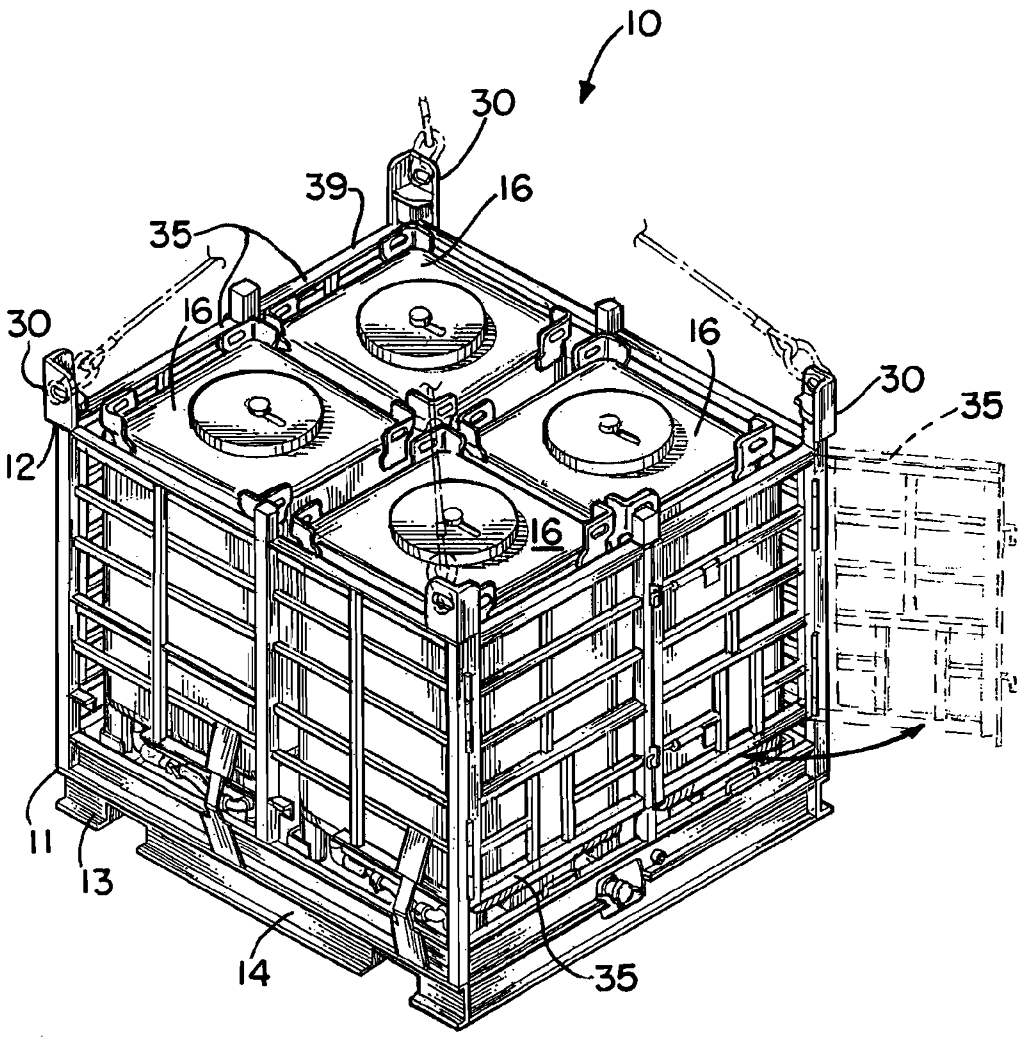
FIG. 8 is a perspective view of the preferred embodiment of the apparatus of the present invention.

Frame 11 provides sidewalls 46, 47 and a plurality of doors 35. Each door 35 is pivotally attached at hinges 48, to frame 11. In FIG. 2, a door 35 attaches to sidewall 46 at hinges 48. Another door 35 attaches to sidewall 47 at hinges 49. Each door 35 is provided with latches 36 for enabling the door 35 to be secured in a closed position. The latch 36 can be a two part arrangement that places one part of the latch 36 on one door and another part of the latch on another door. The doors 35 are provided on opposing ends of the frame 11 as shown in FIG. 8. Each hinge 48, 49 can be attached to a corner column 42-45. A branched header 17 is placed within undercarriage 14 below floor 15 (see FIG. 4).

Branched header 17 has a single flow outlet 25 that received fluid flow from a plurality of branch flowlines 18-21. Valve 22 can be placed in header 17 downstream of flowlines 18-21. Each branch flowline 18-21 extends to a position that is next to a fluid containing tank or module 16. For example, each branch flowline 18-21 can extend generally to a corner or corner column 42-45 or to a side wall 46-47 of frame 11. Each branch flowline 18-21 extends to a riser section 32. Each riser section 32 can be located at a position that is next to outlet piping 23 of a tank or module 16. The riser section 32 can include a preferably flexible section 24 (e.g. hose) of each branch flowline 18-21. The flexible section 24 extends above floor 15 and connects with the outlet piping 23 of a module or tank 16 above floor 15 as shown.

Figure 3:
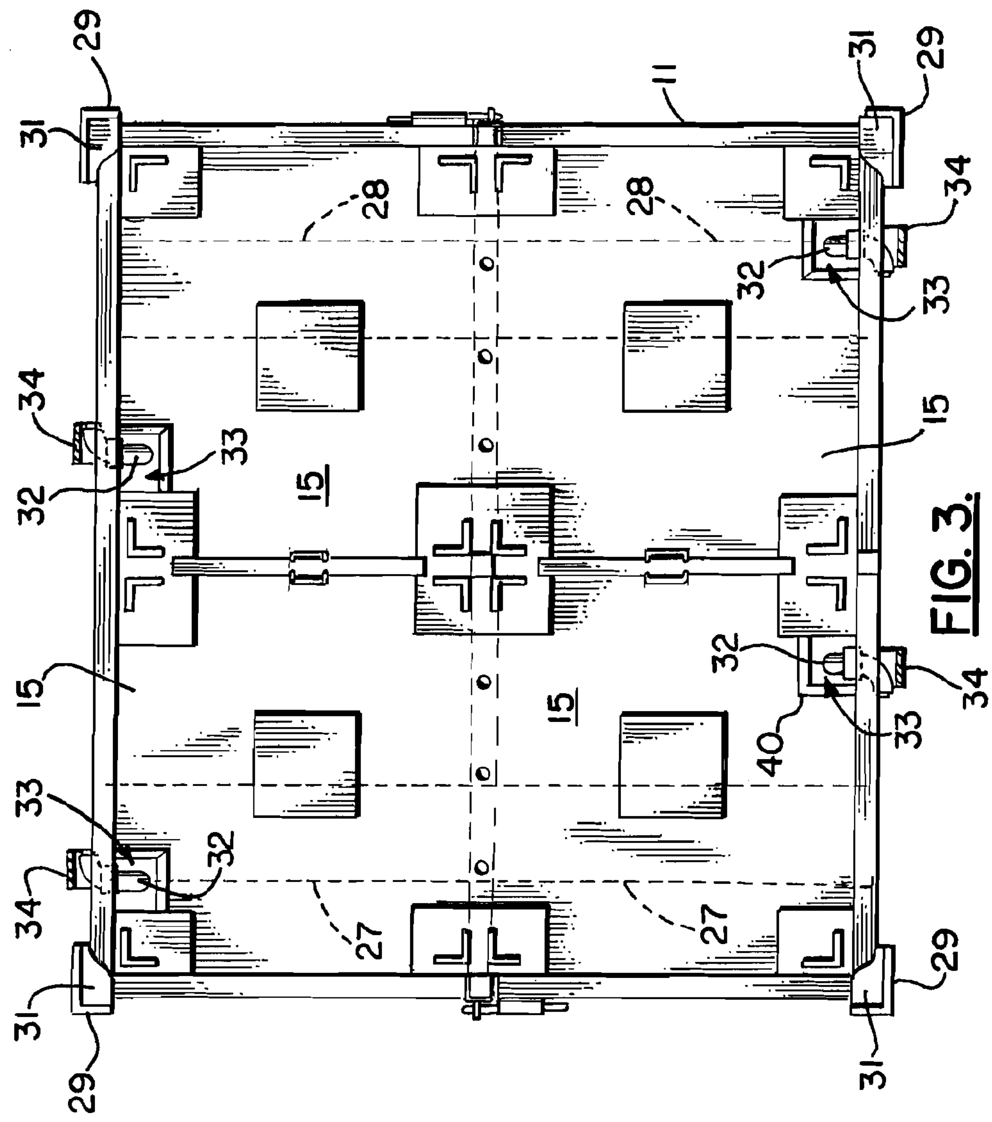
FIG. 3 is a top view of the preferred embodiment of the apparatus of the present invention taken along lines 3-3 of FIG. 1.
Figure 7:
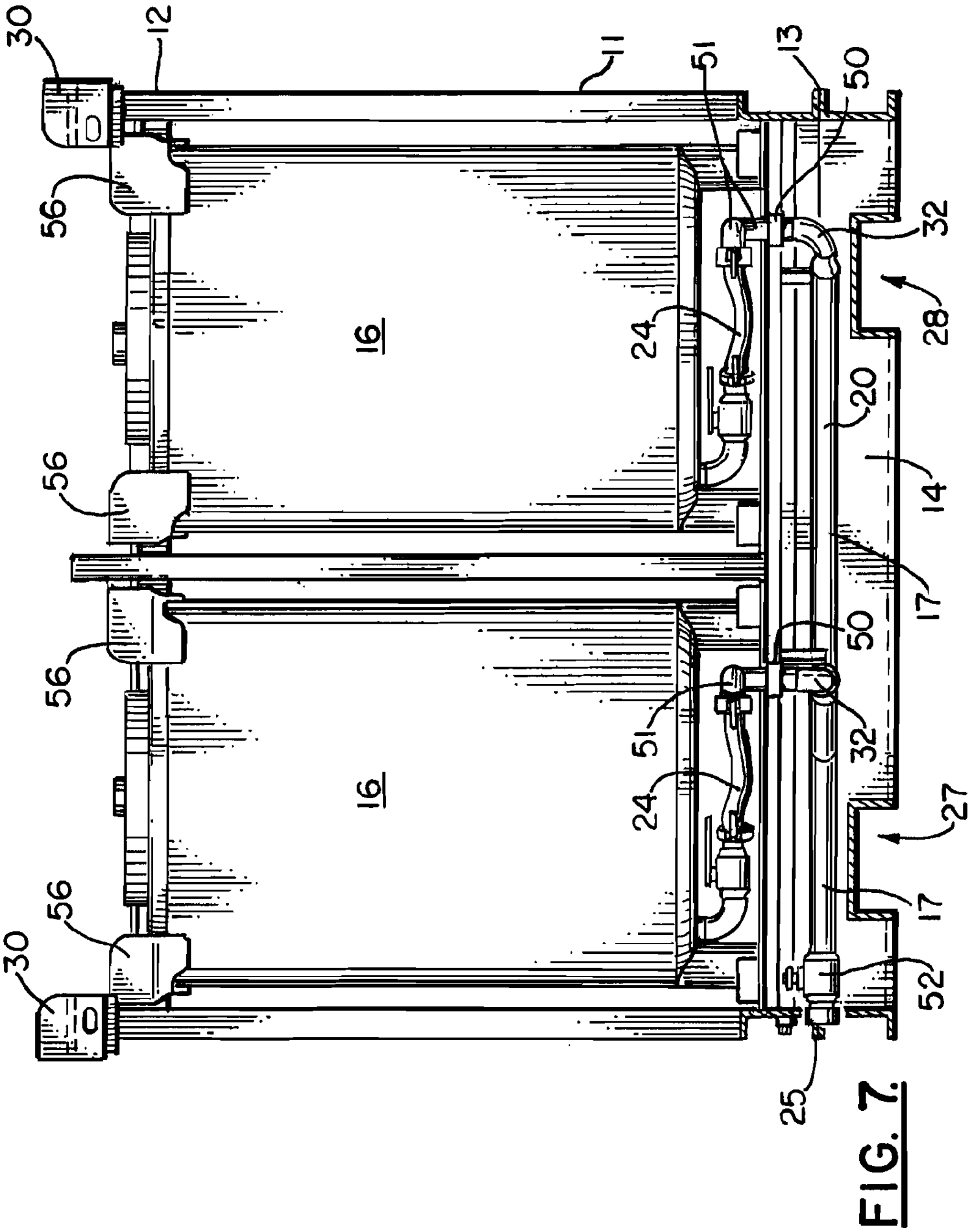
FIG. 7 is an elevation view of the preferred embodiment of the apparatus of the present invention.

The riser section 32 can be rotatable about a generally vertical axis at rotary joint 50. This combination of rotation and the flexible section 24 assist in forming a connection between a branch flowline 18-21 and a tank or module 16 (see FIG. 7). Riser section 32 can extend through an opening 33 in floor 15 as shown in FIGS. 2 and 3. The riser section 32 can include a pair of elbows 51 above rotary joint 50. A guard 34 can protect riser section 32 from damage such as when adding tanks or modules 16 to or removing them from frame 11. A drip pan at 40 can be placed under riser 32 to prevent pollution of the environment.

Flow from any tank or module 16 can be controlled with a valve 52 of the outlet fitting 23 using valve handle 53. Valve 52 is a part of section 26 of outlet fitting 23. Section 26 can be a one piece, cast member which includes an elbow 37 (e.g. twenty degree elbow). Section 26 connects to elbow outlet fitting 54 which drains tank 16.

The undercarriage 14 has forklift tine sockets 27, 28 that are receptive of the tines of a forklift. The frame 11 can also be lifted with rigging such as slings and a crane lift line connected to corner fittings 30 (see FIG. 8). Frame 11 has an open top so that tanks or modules 16 can be lowered to a selected section of floor 15 or lifted up and removed from floor 15 and frame 11. Tanks or modules 16 can also be loaded via doors 35. One frame 11 can stack upon another frame at corner fittings 30 wherein an upper frame 11 undercarriage 14 rests upon the horizontal plates 31 of corner fittings 30 of a lower frame 11. Corner fittings 30 include vertical ell shaped sections 29 that prevent lateral movement when one apparatus 10 is stacked upon another apparatus 10.

Doors 35 on frame 11 can be pivotally attached thereto and closed using latch 36. Doors 35 enable a module or tank 16 to be added to or removed from a selected section of floor 15 using a forklift.

Figure 5:
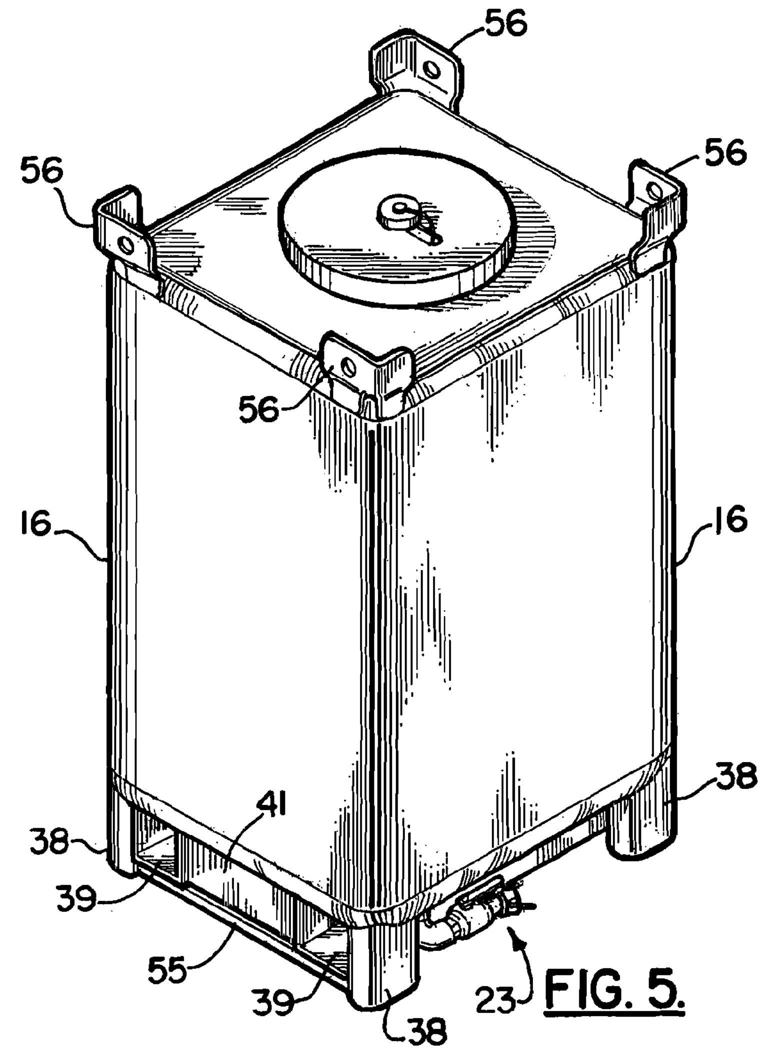
FIG. 5 is a fragmentary view of the preferred embodiment of the apparatus of the present invention.
Figure 6:
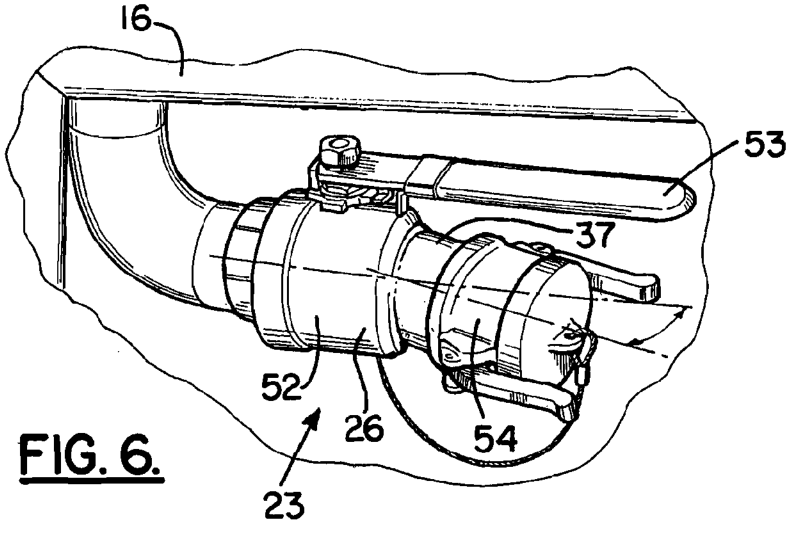
FIG. 6 is a fragmentary view of the preferred embodiment of the apparatus of the present invention.

In FIG. 5, each tank or module 16 has an undercarriage 14 with legs 38, forklift sockets or channels 39, and forklift guard 41 (spanning between two legs and connected to each). A forklift can insert its tines into the sockets 39 of undercarriage 55 of a tank or module 16 (see FIG. 5). In this fashion, a forklift can lift a tank or module 16 and place it on floor 15 of frame 11 by opening a door 35 as shown in FIG. 8. Each tank or module 16 has fittings 56 that enable the tank or modules 16 to be stacked one upon the other. The fittings 56 to be lifted with a crane or other lifting device by attaching rigging such as slings, shackles, etc. to the fittings 56. Thus the tanks or modules 16 can be placed on the floor 15 of frame 11 using either a forklift or a crane or like lifting device. The tank 16 can thus be added to the frame 11 by opening a door 35 and moving the tank or module 16 laterally through the opening that was vacated by door 35 and placing the tank or module 16 on the floor 15. The tank or module 16 could also be lowered to the floor 15 from above wherein an opening of a door 35 is not required.

Frame 11 can be as shown in FIGS. 1-8. Frame 11 can optionally be as shown and described in U.S. Pat. No. 6,983,704 to Ness, incorporated herein by reference.

The following is a list of suitable parts and materials for the various elements of the preferred embodiment of the present invention.

PARTS LIST

| PART NO. | DESCRIPTION |
|---|---|
| 10 | transport apparatus |
| 11 | frame |
| 12 | upper end portion |
| 13 | lower end portion |
| 14 | undercarriage |
| 15 | floor |
| 16 | module |
| 17 | header |
| 18 | flowline |
| 19 | flowline |
| 20 | flowline |
| 21 | flowline |
| 22 | valve |
| 23 | outlet piping |
| 24 | flexible section |
| 25 | flow outlet |
| 26 | section |
| 27 | forklift tine socket |
| 28 | forklift tine socket |
| 29 | vertical section |

-continued

PARTS LIST

| PART NO. | DESCRIPTION |
| --- | --- |
| 30 | corner fitting |
| 31 | horizontal plate |
| 32 | riser section |
| 33 | opening |
| 34 | guard |
| 35 | door |
| 36 | latch |
| 37 | elbow |
| 38 | leg |
| 39 | forklift socket or channel |
| 40 | drip pan |
| 41 | forklift guard |
| 42 | corner column |
| 43 | corner column |
| 44 | corner column |
| 45 | corner column |
| 46 | side wall |
| 47 | side wall |
| 48 | hinge |
| 49 | hinge |
| 50 | rotary joint |
| 51 | elbow |
| 52 | valve |
| 53 | valve handle |
| 54 | elbow outlet fitting |
| 55 | undercarriage |
| 56 | fitting |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A cargo rack comprising:

a) a frame having a front, a rear, and upper and lower end portions;

b) a plurality of fluid load modules that are supported with the frame during use;

c) the lower end portion having a perimeter beam base with a floor providing multiple load holding positions, each configured to hold a separate one of the fluid load modules;

d) the frame including a plurality of side walls that attach to and extend upwardly from the perimeter beam base and including at least left and right side walls, the frame having four corners with a corner column at each corner;

e) a plurality of gates that are movably mounted to the frame;

f) a header under the floor having a plurality of branch flow lines that each connect with another branch flow line at a connecting position spaced inwardly of the perimeter and a common discharge, each branch flow line being positioned to form a fluid conveying connection with a fluid tank; and g) a discharge fitting on each tank that is connectable with a branch flow line.

2. The cargo rack of claim 1 wherein there are four load holding positions.

3. The cargo rack of claim 1 wherein there are a pair of gates at the front of the frame.

4. The cargo rack of claim 1 wherein a part of the floor is a raised floor that attaches to an upper end portion of the perimeter beams and there are a pair of gates at the rear of the frame.

5. The cargo rack of claim 4 wherein at least a part of the raised floor is inclined.

6. The cargo rack of claim 5 wherein the raised floor attaches to an upper end portion of the perimeter beam.

7. The cargo rack of claim 5 wherein each branch flow line extends to a different load holding position.

8. The cargo rack of claim 1 wherein a part of the floor is a raised floor that attaches to an upper end portion of the perimeter beam.

9. The cargo rack of claim 8 further comprising clamps movably attached to the upper end of the frame between clamping and release positions for restraining vertical movement of a load that is placed on the raised floor.

10. The cargo rack of claim 1 wherein each branch flow line extends in part through the floor to a position above the floor.

11. A fluid tank cargo rack, comprising;

a) a structural, transportable frame having a lower end portion with an undercarriage and a floor above the undercarriage, the undercarriage including multiple perimeter beams defining an undercarriage perimeter;

b) sections on the frame having a plurality of storage locations for holding multiple, separate tanks;

c) a common flow outlet for discharging a selected fluid from a selected tank;

d) a branched header supported by the frame is below the floor, the branched header including multiple flow lines, each flow line connecting to another flow line inwardly of the perimeter;

e) piping that connects to the branched header, enabling a selected one of the tanks to transfer its contents to a said branched header flowline, thus enabling fluid transfer from a selected tank to the common flow outlet; and f) wherein multiple of the flow lines connect, each to another flow line to form at least one acute angle.

12. The fluid tank cargo rack of claim 11 wherein there are at least three storage tanks.

13. The fluid tank cargo rack of claim 11 wherein there are between 2 and 4 storage tanks.

14. The fluid tank cargo rack of claim 11 wherein each of the tanks is fitted to be transportable with a forklift or with a lift line.

15. The fluid tank cargo rack of claim 11 wherein the tanks are of the same size.

16. The fluid tank cargo rack of claim 11 wherein the frame has multiple sides, and the common flow outlets is positioned on a side of the frame.

17. The fluid tank cargo rack of claim 11 wherein the branched header includes a flowline that extends to a section.

18. The fluid tank cargo rack of claim 11 wherein each tank has an outlet and the piping includes a plurality of flow lines, each connectable to a tank outlet.

19. The fluid tank cargo rack of claim 18 wherein each tank has a valved outlet fitting connectable to the branched header at a riser section that extends through the floor.

20. The fluid tank cargo rack of claim 18 wherein the branched header includes multiple user sections that extend from the undercarriage to a position above the floor.

21. The fluid tank cargo rack of claim 10 further comprising flexible flow lines that connect each tank to the branched header.

22. A liquid tank transport apparatus, comprising;

a) a structural, transportable frame;

b) an undercarriage on the frame having a perimeter and a storage area that houses a branched header inwardly of the perimeter, the branched header including multiple flow lines;

c) a floor above the undercarriage having multiple storage locations, each for holding one of a plurality of tanks;

d) a common flow outlet for discharging a selected fluid from a selected tank;

e) each tank being a transportable, crane liftable unit;

f) one or more gates on the frame that enable a tank to be transferred to or removed from the floor;

g) piping that enables a selected one of the said tanks to transfer its contents to the header; and h) wherein multiple of the flow lines connect, one to another to form an acute angle.

23. The liquid tank transport apparatus of claim 22 wherein there are at least three tanks.

24. The liquid tank transport apparatus of claim 22 wherein there are between two and four tanks.

25. The liquid tank transport apparatus of claim 22 wherein the flowlines empty into the common outlet.

26. The liquid tank transport apparatus of claim 25 wherein all of the flowlines extend next to a frame corner.

27. The liquid tank transport apparatus of claim 22 wherein the frame has multiple sides, and all of the flow outlets are positioned on the same side of the frame.

28. The liquid tank transport apparatus of claim 22 wherein the flow outlet is positioned next to a side of the frame.

29. The liquid tank transport apparatus of claim 22 wherein each tank has a tank outlet and the flow lines are each connectable to a tank outlet.

30. The liquid tank transport apparatus of claim 22 wherein each tank has a flow outlet and piping includes multiple flow lines that enable flow to be directed from a selected tank to the outlet, each flowline including a riser that extends above the undercarriage.

31. The liquid tank transport apparatus of claim 22 wherein the frame has one or more doors.

32. The liquid tank transport apparatus of claim 22 further comprising multiple corner columns on the frame.

33. A liquid tank transport apparatus, comprising;

a) a structural, transportable frame;

b) an undercarriage on the frame having a perimeter and a header with multiple flowlines that extend inwardly of the perimeter and a common flow outlet;

c) a plurality of tanks on the undercarriage, each having an interior for holding a liquid;

d) a plurality of tank outlets for discharging a selected fluid from a selected tank;

e) risers on the frame that extend above undercarriage and configured to receive flow from a tank;

f) a piping system that includes multiple flow lines, at least one flow line communicating with each tank, and each flow line communicating with the branched header; and g) at least two of said flowlines connecting to form an acute angle.

* * * * *